US010620000B2

(12) United States Patent
Sakano et al.

(10) Patent No.: US 10,620,000 B2
(45) Date of Patent: Apr. 14, 2020

(54) CALIBRATION APPARATUS, CALIBRATION METHOD, AND CALIBRATION PROGRAM

(71) Applicant: CLARION CO., LTD., Saitama-shi, Saitama (JP)

(72) Inventors: Morihiko Sakano, Tokyo (JP); Keiji Sato, Saitama (JP)

(73) Assignee: CLARION CO., LTD., Saitama (JP)

( * ) Notice: Subject to any disclaimer, the term of this patent is extended or adjusted under 35 U.S.C. 154(b) by 108 days.

(21) Appl. No.: 15/767,583

(22) PCT Filed: Oct. 20, 2016

(86) PCT No.: PCT/JP2016/081081
§ 371 (c)(1),
(2) Date: Apr. 11, 2018

(87) PCT Pub. No.: WO2017/069191
PCT Pub. Date: Apr. 27, 2017

(65) Prior Publication Data
US 2018/0292201 A1 Oct. 11, 2018

(30) Foreign Application Priority Data
Oct. 20, 2015 (JP) .................................. 2015-205979

(51) Int. Cl.
*G07F 17/24* (2006.01)
*E01F 9/615* (2016.01)
(Continued)

(52) U.S. Cl.
CPC ................ *G01B 11/26* (2013.01); *G06T 7/80* (2017.01); *H04N 5/225* (2013.01); *H04N 5/232* (2013.01);
(Continued)

(58) Field of Classification Search
CPC . G01B 11/26; G06T 7/80; G06T 2207/30256; G06T 2207/30264; H04N 5/232; H04N 7/18
See application file for complete search history.

(56) References Cited

U.S. PATENT DOCUMENTS

2009/0160940 A1 6/2009 Imamura
2014/0139674 A1 5/2014 Aoki et al.
(Continued)

FOREIGN PATENT DOCUMENTS

JP 2009-151524 A 7/2009
JP 2009-253571 A 10/2009
(Continued)

OTHER PUBLICATIONS

Extended European Search Report dated Apr. 12, 2019 for the European Patent Application No. 16857504.1.
(Continued)

*Primary Examiner* — Jamil Ahmed
(74) *Attorney, Agent, or Firm* — Volpe and Koenig, P.C.

(57) ABSTRACT

This calibration apparatus calibrates a camera mounted on a vehicle and includes: an image obtaining unit that obtains an image of outside of the vehicle; and a calibration unit that calibrates a camera parameter which is the roll angle and/or the pitch angle of the camera by using corresponding feature points in an image of the vehicle captured before a change in the attitude thereof and in an image captured after the change in the attitude thereof.

8 Claims, 11 Drawing Sheets

(51) Int. Cl.

| | | |
|---|---|---|
| *E04H 12/22* | (2006.01) | |
| *E01F 9/681* | (2016.01) | |
| *E04H 6/42* | (2006.01) | |
| *G01B 11/26* | (2006.01) | |
| *H04N 5/232* | (2006.01) | |
| *H04N 7/18* | (2006.01) | |
| *H04N 5/225* | (2006.01) | |
| *G06T 7/80* | (2017.01) | |

(52) U.S. Cl.
CPC ..... *H04N 7/18* (2013.01); *G06T 2207/30252* (2013.01); *G06T 2207/30256* (2013.01); *G06T 2207/30264* (2013.01)

(56) References Cited

U.S. PATENT DOCUMENTS

| | | | |
|---|---|---|---|
| 2015/0029338 A1 | 1/2015 | Lee et al. | |
| 2018/0300898 A1* | 10/2018 | Eshima | G06T 7/80 |

FOREIGN PATENT DOCUMENTS

| | | | |
|---|---|---|---|
| JP | 2011-217233 A | 10/2011 | |
| JP | 2014-101075 A | 6/2014 | |
| JP | 2014101075 A * | 6/2014 | ............... G06T 1/00 |
| WO | 2012/139660 A1 | 10/2012 | |
| WO | 2012/143036 A1 | 10/2012 | |

OTHER PUBLICATIONS

Hartley et al., "Epipolar Geometry and the Fundamental Matrix," Multiple View Geometry in Computer VI, Cambridge University Press, GB, XP007917550 (2003).

Hartley, "Estimation of Relative Camera Positions for Uncalibrated Cameras," In: Sandini G. (eds) Computer Vision—ECCV'92. ECCV 1992. Lecture Notes in Computer Science, vol. 588, XP019185764 (1992).

Japanese Office Action dated Apr. 2, 2019 for the Japanese Patent Application No. 2015-205979.

International Search Report dated Dec. 27, 2016 of the PCT International Application No. PCT/JP2016/081081.

Chinese Office Action dated Sep. 26, 2019 for the Chinese Patent Application No. 201680058416.6.

* cited by examiner

CALIBRATION APPARATUS, CALIBRATION METHOD, AND CALIBRATION PROGRAM

TECHNICAL FIELD

The present invention relates to a calibration apparatus, a calibration method, and a calibration program.

BACKGROUND ART

In recent years, in-vehicle cameras have been spreading for the purpose of supporting a driver's driving. For example, there is a system that performs viewpoint conversion on each image of a plurality of cameras mounted around a vehicle, composes the image, and presents an overhead view image of the surroundings of the vehicle to a driver, or a system that controls a vehicle by using a result of measuring a position of an object outside the vehicle.

The accuracy of the in-vehicle camera is determined by camera-specific parameters (internal parameters) such as optical characteristics, such as a focal length or a lens distortion, or a size of an imaging device, and parameters (external parameters) related to a mounting position or an angle (a roll angle, a pitch angle, or a yaw angel) of each camera. The internal parameters and the external parameters are collectively referred to as camera parameters.

Although the camera is attached to the vehicle at a position or an angle conforming to a predetermined design value, an error occurs at this time and the accuracy of the camera deteriorates. Therefore, a mounting error from a design value of a camera parameter has been corrected. This is referred to as calibration or correction.

Since the calibration is required to correct an error with high accuracy, there is no method of mechanically adjusting an installation state of a camera, and a current installation state is estimated from a photographed image. As a method of estimating an installation state from a photographed image, a method is generally adopted which accurately places and photographs a calibration mark (also referred to as a pattern or a calibration chart) printed on a paper or a plate at a predetermined position and correcting a camera parameter such that an actual photographed image matches an image photographed by a camera manufactured and installed according to a design value.

Meanwhile, such a calibration has been generally performed before shipment of a vehicle at a place where a camera is installed, for example, in a factory, but recently, as disclosed in PTL 1 or PTL 2, it has been proposed to execute calibration even after factory shipment by using an object such as a white line, for example, as a calibration mark during traveling. The calibration during traveling is excellent in that it is also possible to cope with a change in a camera parameter that can occur after factory shipment.

As one of the causes of the change in the camera parameter afterwards, it is considered that a loading state of an object with respect to a vehicle changes according to circumstances, for example, a difference in the number of passengers, a difference in places to sit, and a difference in a method of loading a baggage. When such a loading state changes, the attitude of the vehicle changes and the installation state of the camera with respect to the ground (that is, camera parameter) changes.

CITATION LIST

Patent Literature

PTL 1: WO 2012/143036
PTL 2: WO 2012/139660

SUMMARY OF INVENTION

Technical Problem

However, in the calibration during traveling disclosed in PTL 1 and PTL 2, there is a problem that camera calibration cannot be executed until a vehicle travels a certain distance even after a loading state has changed.

In addition, when executing calibration during traveling, since a calibration mark such as a white line always moves relative to the vehicle, there is a possibility that the accuracy of the calibration cannot necessarily be improved.

Therefore, an object of the present invention is to provide a calibration apparatus, a calibration method, and a calibration program, which are capable of executing calibration quickly when a camera parameter can change as a loading state of an object with respect to a vehicle changes.

Solution to Problem

According to a first aspect of the present invention, a calibration apparatus for calibrating a camera mounted on a vehicle, includes: an image acquisition unit which acquires an image of outside of the vehicle; and a calibration unit which calibrates a camera parameter of at least one of a roll angle and a pitch angle of the camera by using a corresponding feature point between an image before an attitude change of the vehicle and an image after the attitude change.

According to a second aspect of the present invention, a calibration method of calibrating a camera mounted on a vehicle acquires an image of the outside of the vehicle, and calibrates a camera parameter of at least one of a roll angle and a pitch angle of the camera by using a feature point corresponding between an image before the attitude change of a vehicle and an image after the change.

According to a third aspect of the present invention, a calibration program product that causes a computer to calibrate a camera mounted on a vehicle includes an image acquisition unit which acquires an image of the outside of the vehicle, and a calibration unit which calibrates a camera parameter of at least one of a roll angle and a pitch angle of the camera by using a feature point corresponding between an image before the attitude change of a vehicle and an image when the vehicle is started.

Advantageous Effects of Invention

According to the present invention, when a camera parameter can change as a loading state of an object with respect to a vehicle changes, calibration can be quickly executed.

DESCRIPTION OF EMBODIMENTS

Hereinafter, a calibration apparatus, method, and program according to an embodiment of the present invention will be described with reference to the drawings.

Figure 1:
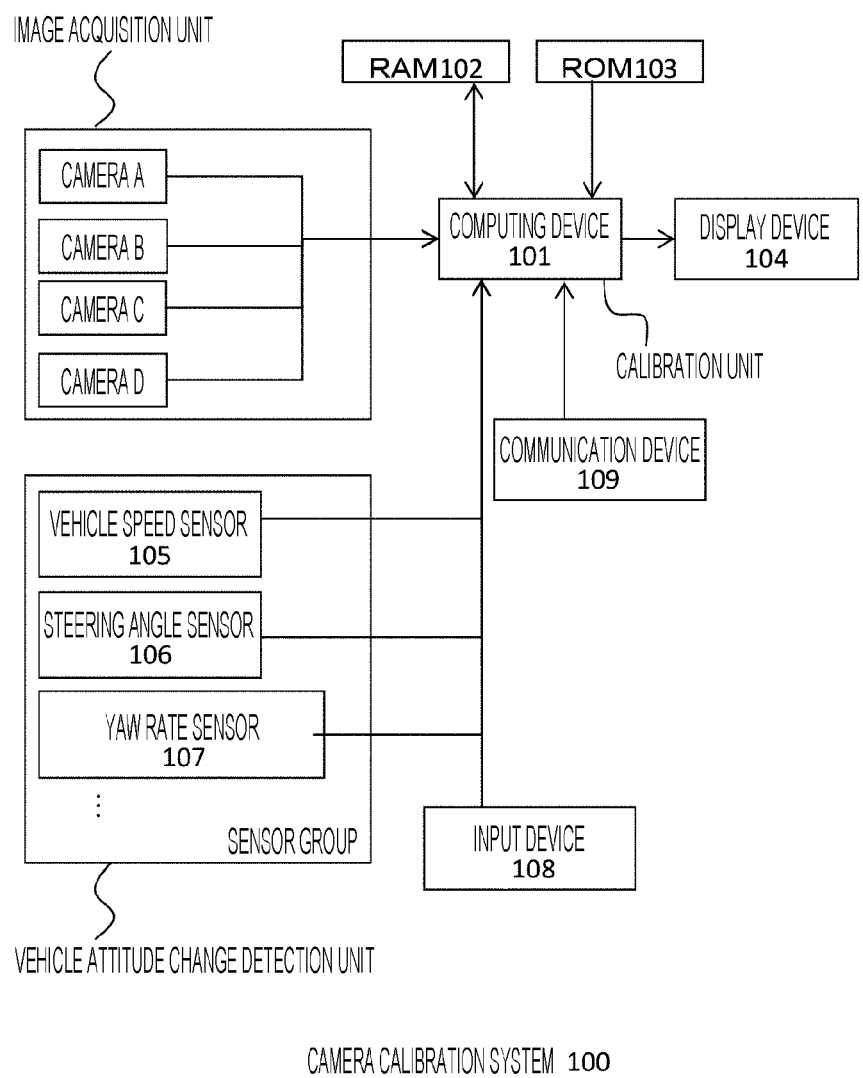
FIG. 1 is a block diagram of a system configuration.

FIG. 1 illustrates a calibration system 100 according to this embodiment. The calibration system 100 mainly includes cameras A, B, C, and D, a computing device 101, a RAM 102, a ROM 103, a display device 104, a vehicle speed sensor 105, a steering angle sensor 106, a yaw rate sensor 107, an input device 108, and a communication device 109.

The cameras A, B, C, and D are mounted on a vehicle and are installed at the front, rear, left, and right, respectively. For example, the front and rear cameras are installed near, for example, a license plate, and the left and right cameras are installed under, for example, side mirrors. In the examples illustrated in FIGS. 3 and 4, the camera A is attached to the front side of the vehicle, the camera B is attached to the rear side of the vehicle, the camera C is attached to the left side of the vehicle, and the camera D is attached to the right side of the vehicle. The cameras A, B, C, and D are mounted such that an optical axis is parallel to the ground or is directed downward.

The cameras A, B, C and D are mounted according to predetermined design values. However, in practice, a mounting error usually occurs and the error is unknown. A wide-angle fish-eye camera is used for the cameras A, B, C, and D such that an image all around the vehicle can be acquired. The fish-eye camera can acquire a wide-angle image, and the image is distorted according to a known distortion function. Four images photographed by the cameras A, B, C, and D are transmitted to the computing device 101.

The computing device 101 receives a variety of information from the cameras A, B, C, and D or the vehicle speed sensor 105, the steering angle sensor 106, the yaw rate sensor 107, the input device 108, the communication device 109, and the like, and performs computation based on the program or the like stored in the ROM 103. For example, viewpoint conversion and composition are performed on the images input from the cameras A, B, C, and D, and computation is performed for generating an overhead view image such as looking down at the ground from above.

Specifically, the computing device 101 generates an image from which the distortion of the image has been removed for the images input from the cameras A, B, C, and D by using a known distortion function previously stored in the ROM 103 or the like, and converts the viewpoint of each of the images from which the distortion has been removed into the overhead viewpoint, and composes an image viewed from the overhead viewpoint, based on a known design value or the like related to camera mounting previously stored in the ROM 103 or the like. This is implemented by calculating specific pixels of the overhead view image and specific pixels of the corresponding cameras A, B, C, and D by using a well-known geometric conversion formula of the camera and assigning a luminance value of the pixel to a pixel of the overhead view image. When the corresponding pixel includes a decimal point and there is no corresponding pixel, a process of assigning an intermediate luminance of surrounding pixels is performed by a well-known luminance interpolation process.

In addition, the computing process is performed by using the output results of the vehicle speed sensor 105, the steering angle sensor 106, the yaw rate sensor 107, and the communication device 109, and an operation program is switched according to the input result of the input device 108.

In the RAM 102, numerical data required in the computing process procedure of the computing device 101, variables of the program for processing results in the process of computation and the like are written. In addition, as necessary in the computing process procedure, the written data is read and used for the computing process. In addition, the RAM 102 also stores image data or the like photographed by the cameras A, B, C, and D.

In the ROM 103, for example, information to be used without rewriting is previously stored among a program for executing the calibration and information required for the program. The previously stored information is, for example, a camera parameter such as a design value of a camera installation position and angle, a focal length of a camera, a pixel size, a center of an optical axis, a distortion function, and the like.

The display device 104 receives the processing result of the computing device 101 and presents the processing result to the user by using a display or the like. For example, an overhead view image obtained by performing viewpoint conversion and composition on the four images of the cameras A, B, C, and D is displayed for the driver. In addition, the display device 104 can also switch display contents according to the output of the computing device, such as displaying only the image of the camera B photographing the rear of the vehicle.

The vehicle speed sensor 105, the steering angle sensor 106, and the yaw rate sensor 107 are sensors which observe the vehicle speed, the steering angle, and the yaw rate, respectively, and are used in the computing process of the computing device 101.

The input device 108 is a device which receives a user's operation such as a switch or a button. It is used for turning on or off the calibration function, initializing the calibration result, changing the calibration method, and the like.

Figure 2:
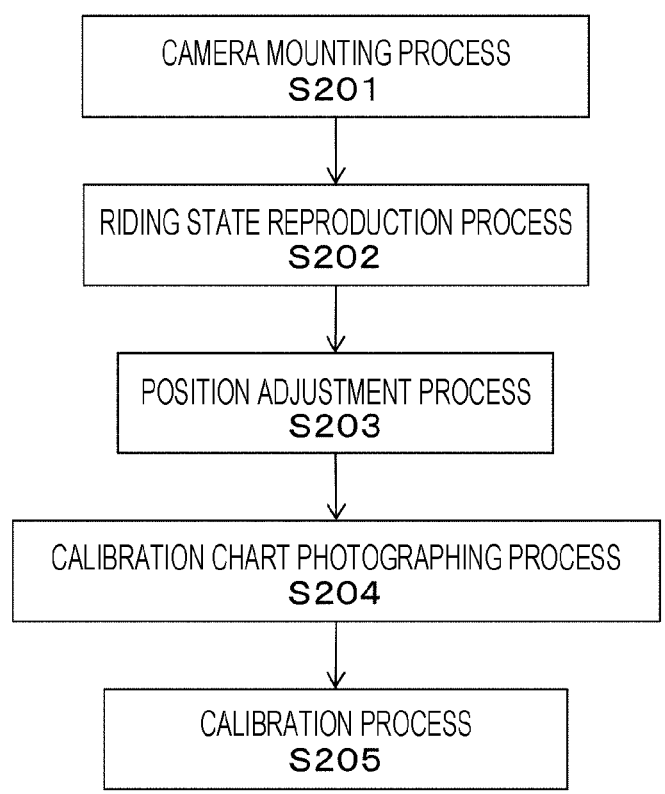
FIG. 2 is a flowchart of a calibration procedure at the time of factory shipment.

FIG. 2 illustrates a general in-vehicle camera calibration procedure at the time of product shipment and describes a problem that may occur at the time of use. First, the in-vehicle camera calibration at the time of product shipment is executed in the order of, for example, a camera mounting operation S201, a riding state reproduction operation S202, a position adjustment operation S203, a calibration chart photographing operation S204, and a calibration operation S205.

In the camera mounting operation S201, a camera is attached to a vehicle body.

The riding state reproduction operation S202 reproduces a state in which a passenger is on the vehicle. For example, an actual riding state is reproduced when a driver actually gets on a driver's seat or when an object having a weight corresponding to the weight of the driver is loaded. The reason for performing the riding state reproduction operation S202 is that the attitude of the vehicle changes according to the riding state and the angle of the camera with respect to the ground changes accordingly. In a case where the angle or position of the camera is different from a designed mounting state, a deviation occurs at a boundary of a composite image, or an error occurs when a position measurement is performed by the camera. Thus, it is necessary to execute calibration by taking into account the changed angle. By reproducing the riding state, a camera mounting state corresponding thereto is reproduced.

The position adjustment operation S203 adjusts the vehicle and the calibration chart to have a predetermined positional relationship. General calibration is executed such that a positional relationship between a calibration chart and a camera is defined as a specified positional relationship.

In the calibration chart photographing operation S204, the calibration chart is photographed by the camera attached to the vehicle.

In the calibration operation S205, calibration is executed by using a photographed image. At this time, for example, calibration is executed by a well-known technique. In other words, when the camera is mounted as designed and the calibration chart is installed at a specified position, a position at which the calibration chart should appear is calculated, and the camera parameter used for image conversion in the program is adjusted such that the calibration chart in the actually photographed image appears at the position at which the calibration chart should appear.

Regarding the calibration operation S205, for example, a well-known technique capable of executing calibration even if the positional relationship between the calibration chart and the vehicle is indeterminate may be used. In this case, the procedure of the position adjustment operation S203 is unnecessary. However, when the calibration is executed by such a procedure, a calibration assuming a specific riding state is executed just as it is performed in the riding state reproduction operation S202, and if the riding state is different from that during the calibration, a deviation occurs in a composite boundary of an overhead view image or an error occurs in the position measurement by the camera. Therefore, it is not always sufficient to execute calibration in a specific riding state.

For this reason, it is preferable to add a dynamic calibration to execute calibration every time according to the riding state. According to the present invention, the calibration process is performed in a stopped state, not during a traveling of a vehicle. Details thereof will be described below with reference to the drawings.

The overview of the calibration process in this embodiment will be described. A basic idea is to compare images before and after an attitude change and estimate a position and an attitude of the camera from a difference in appearance of the images caused by the attitude change.

When a camera attitude changes, an amount of movement of an object in the image changes according to a distance to the object in the image. For example, there is a property that an object having a short distance has a large change amount in the image and an object having a long distance has a small change amount in the image. The photographed camera image itself includes only two-dimensional information, but since it is actually based on three-dimensional information, such a change appears at the time of photographing. By using this property, the change amount of the object in the image before and after the attitude change is observed, and the camera calibration is executed from that information.

Therefore, in this embodiment, first, camera images before the attitude change are acquired and stored by the cameras A, B, C, and D attached to the vehicle. Next, when the attitude change occurs, the images are acquired by the cameras A, B, C, and D. Next, in order to observe the change amount of the object in the image, the correspondence relationship of each pixel between the images before and after the attitude change of each of the cameras A, B, C, and D is obtained. When the correspondence relationship between the pixels is obtained, there are cases where an error is included in the correspondence relationships and there are cases where it is difficult to take countermeasures when operating in a real environment. Therefore, a process including coping with the problem is performed. Finally, from the obtained correspondence relationship, a process of estimating a camera parameter including a camera position and attitude after the attitude change (that is, a camera calibration process) is performed. The above is a rough overview of the process. Details of the process will be described below.

The attitude change of the vehicle is detected by a vehicle attitude change detection unit. Specifically, the vehicle attitude change detection unit detects the change of the vehicle attitude based on output information of a load sensor or an attitude sensor. However, besides this, the vehicle attitude change detection unit may detect opening and closing of a door of the vehicle. This is because, when the door is opened and closed, an operation accompanied by some attitude change such as getting on and off of people and loading and unloading of baggage is usually accompanied, and thus, it is detected by estimation that the vehicle attitude has changed based on the operation of opening and closing the door.

Figure 3:
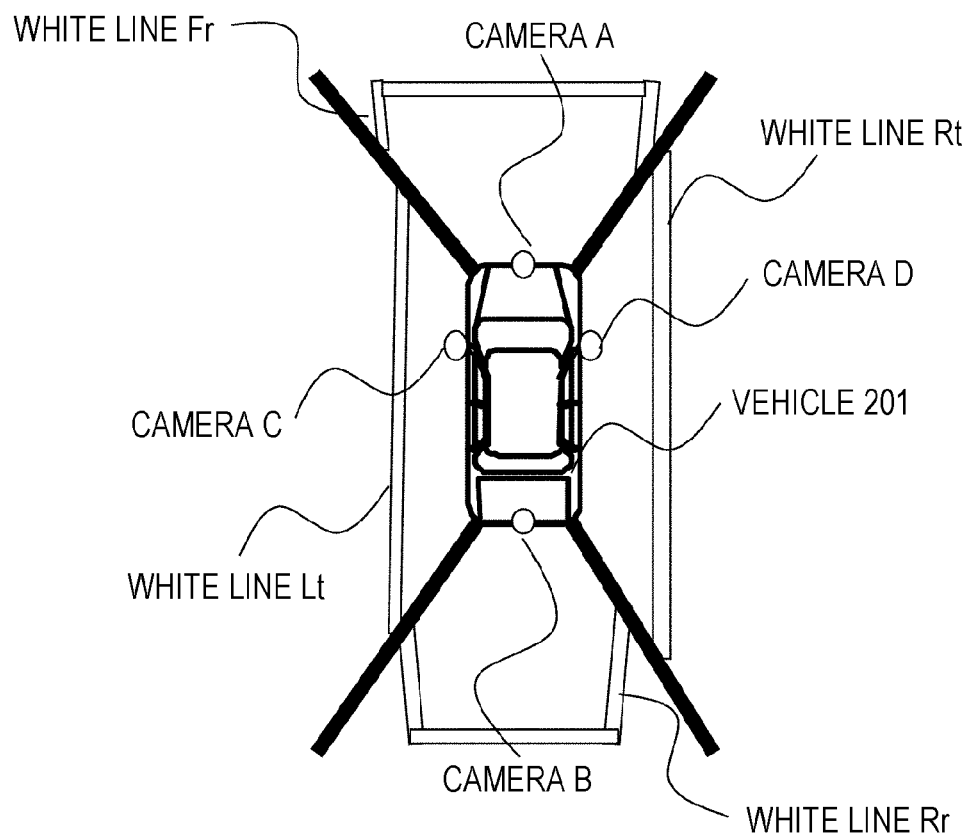
FIG. 3 is an overhead view image before calibration.
Figure 4:
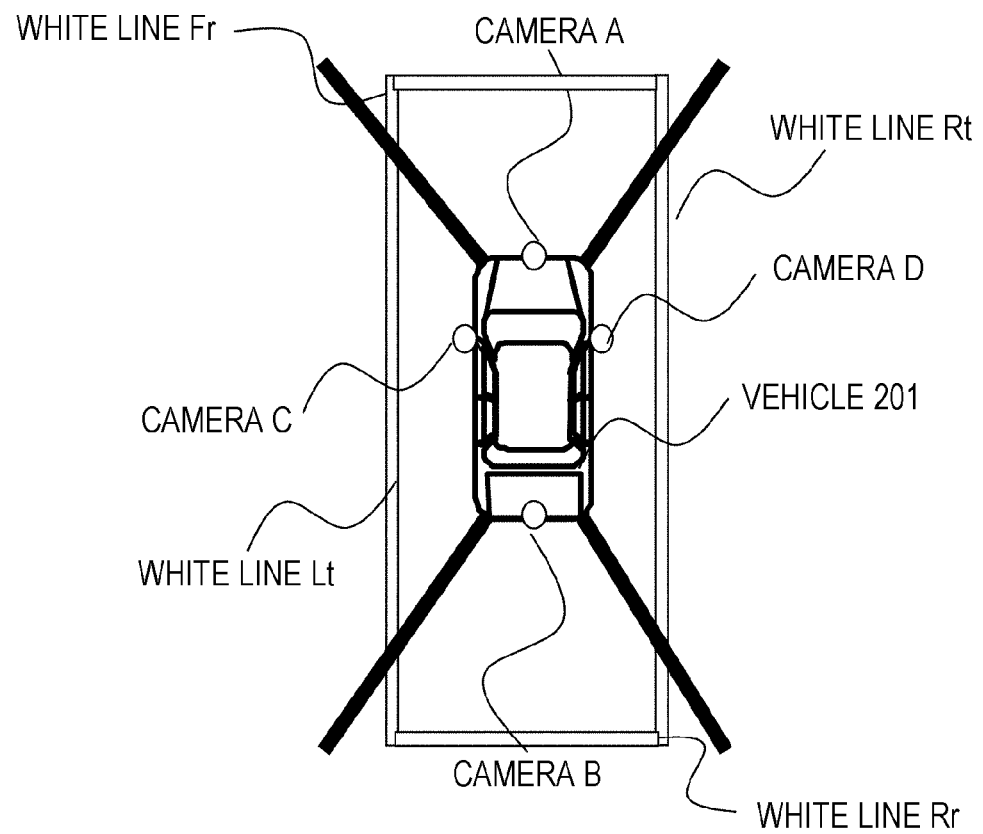
FIG. 4 is an overhead view image after calibration.

FIGS. 3 and 4 illustrate the change in the overhead view image by the calibration process. FIG. 3 illustrates an example of an overhead view image in a case where the calibration before the factory shipment is performed in the procedure of S201 to S205 of FIG. 2 and then the loading state is different from the case of the calibration before the shipment. In the overhead view image, a white line frame is displayed. Originally, the white line frame shows a rectangular shape, but since it is different from the assumed loading state, the camera angle or position with respect to the ground has changed and a deviation occurs in the white line at a composite boundary of the images of the cameras A, B, C, and D.

In such a situation, in this embodiment, it is possible to correct the overhead view image by executing the camera calibration such that the deviation of the white line disappears as illustrated in FIG. 4. It should be noted that it does not necessarily mean that the calibration is executed by using the white line frame illustrated in the drawing. The calibration not only can correct the overhead view image but also can accurately perform the position measurement on the ground.

Figure 5:
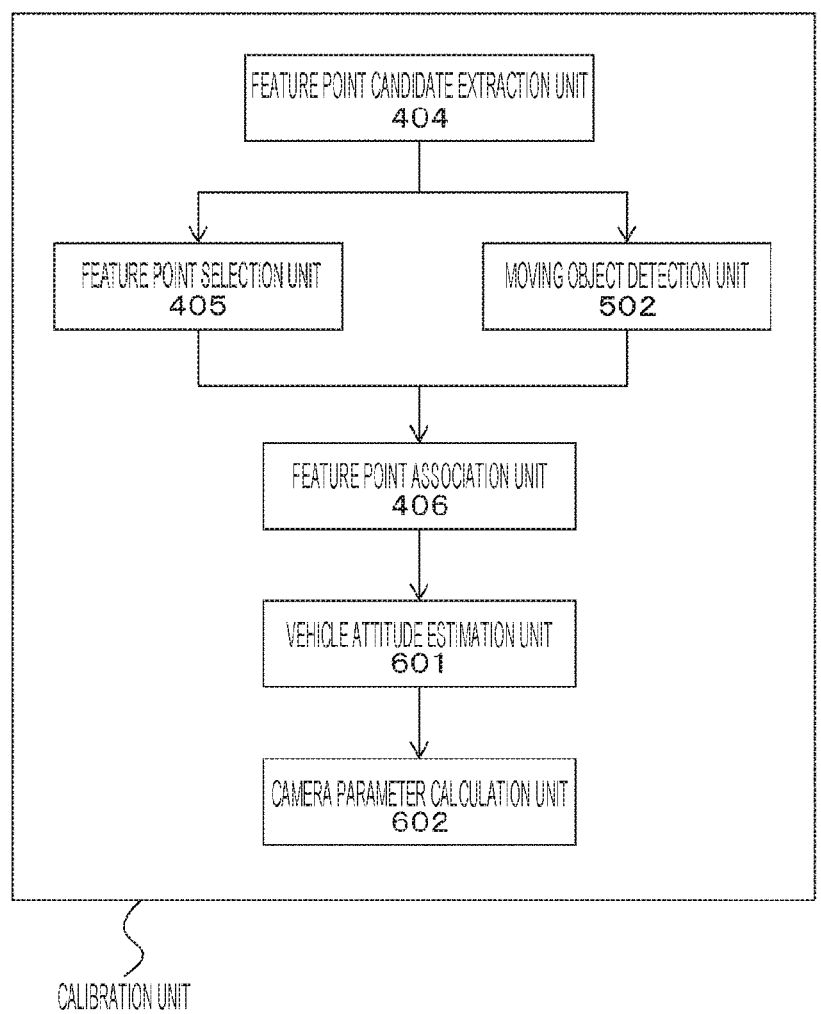
FIG. 5 is a block diagram of a calibration unit.

Hereinafter, the calibration process of this embodiment will be described. First, FIG. 5 is a block diagram of a calibration unit in the calibration system 100 according to this embodiment. Although described in detail below, the calibration unit includes a feature point candidate extraction unit 404, a feature point selection unit 405, a moving object detection unit 502, a feature point association unit 406, a vehicle attitude estimation unit 601, and a camera parameter calculation unit 602. The feature point candidate extraction unit 404 performs a process of extracting, for example, points to be candidates for performing association as feature points from the images before the attitude change photographed by the cameras A, B, C, and D. The feature point selection unit 405 performs a process of selecting a candidate date point to be used for feature point association from feature point candidates. The moving object detection unit 502 performs a process of detecting a moving object from the image. The feature point association unit 406 performs a process of associating a feature point by using feature point candidates and corresponding region information thereof. The vehicle attitude estimation unit 601 performs a process of obtaining a vehicle attitude parameter associated with the feature points of the four cameras with no error by an optimization technique. The camera parameter calculation unit 602 performs a process of calculating four camera parameters by using the obtained vehicle attitude parameter.

Next, the procedure overview of the calibration process is described. First, when the vehicle is stopped, an image is acquired and stored. Next, an image after a change of a vehicle attitude is acquired with the opening and closing of the door of the vehicle, the change of the output information of the load sensor or the attitude sensor, or the like as triggers. Subsequently, it is determined whether the vehicle attitude actually changes and the calibration is required. When the calibration is required, subsequently, the association of feature points of images before and after the change of the vehicle attitude is performed. Finally, a camera calibration is executed by using the associated feature points. The obtained camera parameter is reflected to each application using the camera parameter, such as reflection to the parameter when generating the overhead view image or reflection on a predicted course line representing the course of the vehicle at a current steering wheel turning angle on the display device 104 at the time of backing up the vehicle.

When the camera parameter is updated in this manner, the deviation of the image boundary is eliminated in the case of the overhead view image, and in the case of the predicted course line, a course display is corrected, which is more suitable for the actual course of the vehicle. It can also be implemented even in the case of multiple cameras including the four cameras. In the case of multiple cameras, it is possible to improve accuracy and estimation stability by estimating the parameters of the multiple cameras through the vehicle attitude, instead of directly estimating each camera parameter. Details thereof are described below.

Figure 6:
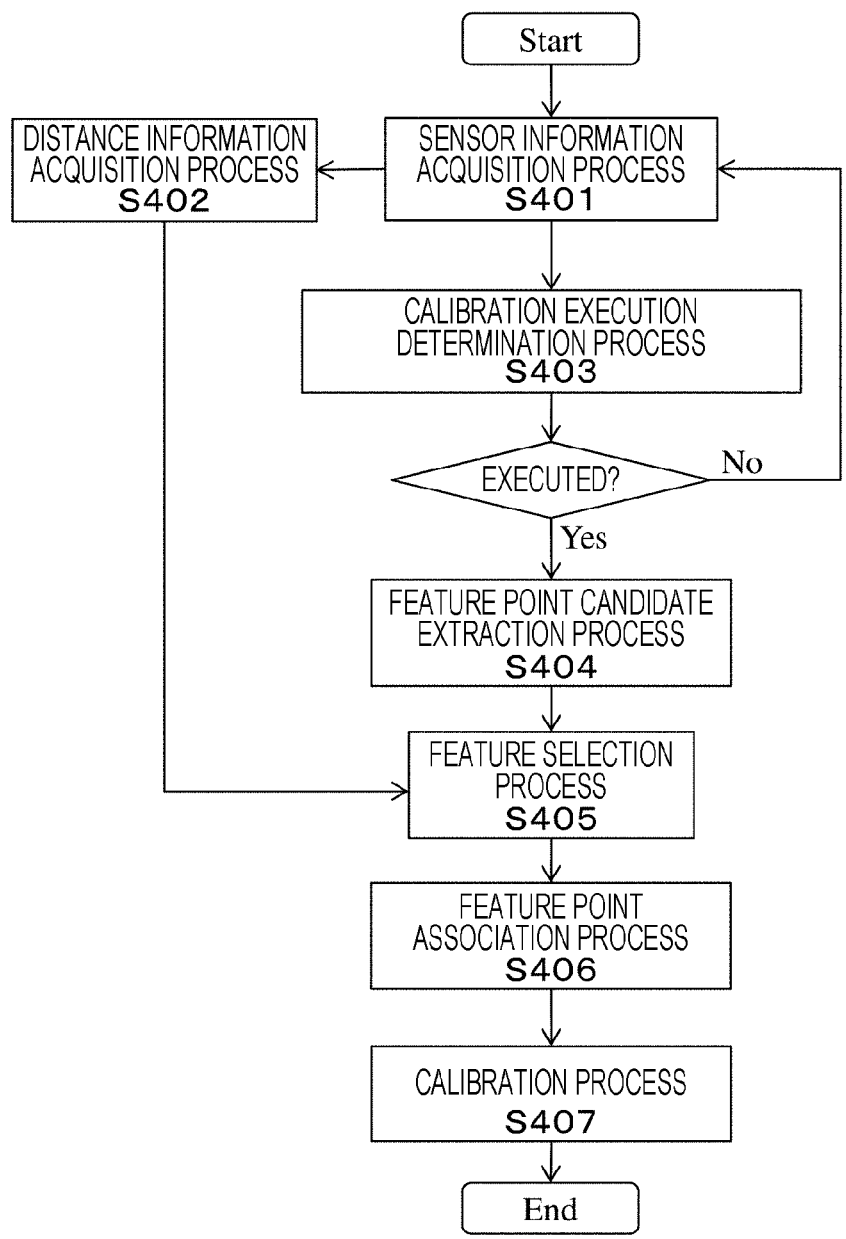
FIG. 6 is a flowchart of an entire program in the calibration system illustrated in FIG. 1.

FIG. 6 illustrates a flowchart of the calibration process according to this embodiment. The calibration process is implemented by a program and is loaded and performed on the computing device 101 in FIG. 1.

The calibration process according to this embodiment consists of a sensor information acquisition process S401, a distance information acquisition process S402, a calibration execution determination process S403, a feature point candidate extraction process S404, a feature selection process S405, a feature point association process S406, and a calibration process S407.

In the sensor information acquisition process S401, images of the cameras A, B, C, and D and a variety of sensor information of the vehicle speed sensor 105, the steering angle sensor 106, the yaw rate sensor 107, and the like are acquired and stored in the RAM 102. Regarding the images of the cameras A, B, C, and D, it is preferable that there is a mechanism of one of whether the four images are completely synchronized and stored and whether a deviation time of the image can be acquired. When there is a synchronization deviation in the image, it appears as an error of calibration. It is preferable that a variety of sensor information of the vehicle speed sensor 105, the steering angle sensor 106, the yaw rate sensor 107, and the like is obtained in synchronization with the image.

In the distance information acquisition process S402, distance information of the object or the feature point included in each camera image from the camera is acquired. The distance information acquired in this process is utilized in the feature selection process S405 in the subsequent stage. The distance information may be acquired by using a camera image or another distance measurement sensor. In the case of acquiring the distance information by using the camera image, for example, a well-known motion stereo technique is used. In the case of utilizing other distance measurement sensors, a sensor-to-sensor calibration is executed so as to obtain a correspondence relationship between pixels in the camera image and observation information of other sensors.

In the calibration execution determination process S403, the presence or absence of the attitude change is detected, and it is determined whether a calibration execution is necessary. For example, in a case where the presence or absence of the attitude change is determined only with the camera image, it can be implemented by determining whether a deviation has occurred on the image with respect to a common photographing part photographing the same object near the image boundary region in all of the four images constituting the overhead view image. Whether the deviation has occurred can be determined, for example, by executing the image collation process of the common photographing part and determining whether an evaluation value of a collation degree exceeds a predetermined threshold value. The image collation can be calculated by, for example, ZSAD which is the sum of difference values of luminance after removing a difference of average values in the target region. Alternatively, a method of determining whether a calibration execution is necessary by detecting that a loading condition on the vehicle has changed by using a sensor directly estimating an attitude change of the vehicle, such as a gyro sensor, may be employed.

When it is determined that the calibration execution is necessary, the feature point candidate extraction unit 404 illustrated in FIG. 5 executes the feature point candidate extraction process S404. If there is no change and the calibration is unnecessary, the process returns to the sensor information acquisition process S401.

Figure 7:
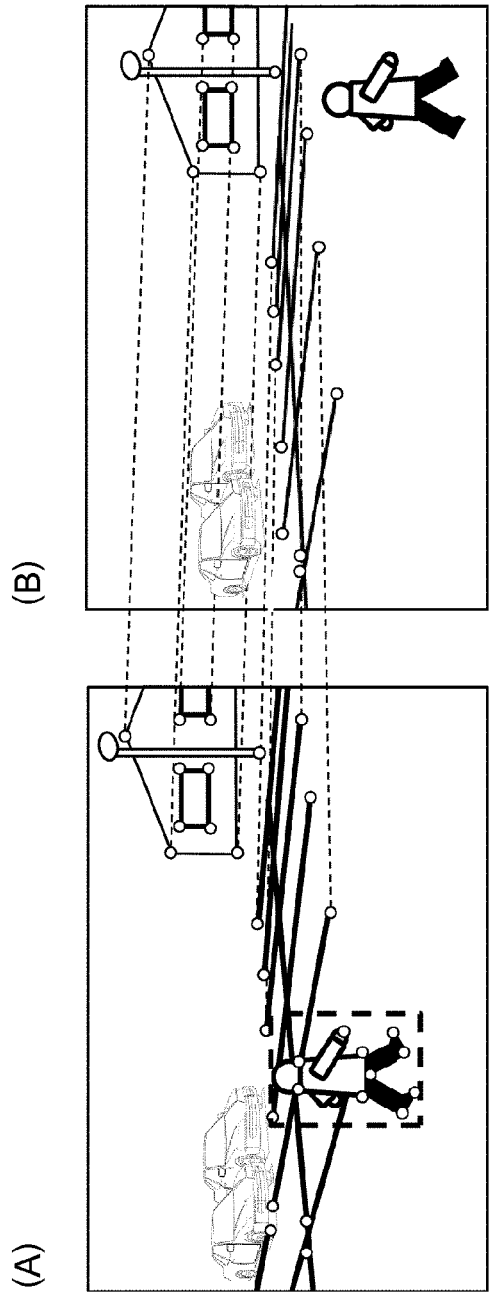
FIG. 7 is an image before and after attitude change.

In the feature point candidate extraction process S404, for example, points to be candidates for performing association are extracted as feature point candidates from images before the attitude change photographed by the cameras A, B, C, and D. FIG. 7 illustrates an example of images before and after the attitude change. In each of the cameras A, B, C, and D, the association of pixels photographing the same point is performed in a subsequent process between the image before the obtained attitude change and the image after the attitude change after it is determined that the calibration execution is necessary. Therefore, in each of the four camera images of the cameras A, B, C, and D, the feature point candidates for performing association are extracted from the image before the attitude change. It may be extracted from the image after the attitude change and associated with the image before the attitude change. In FIG. 7, for convenience of illustration, a white line is shown as a solid black line.

For example, in a scene in which the vehicle is stopped, a corner point including edges in a plurality of directions in which a corresponding position can be clearly determined on an image, such as a corner of a parking frame on a road surface, a contour point of a vehicle which is stopped nearby, one point of a vertex or a pattern of a wall, or the like, is preferably a feature point candidate for performing association. Such an ideal feature point candidate is, for example, a point described with ○ in FIG. 7. However, since an edge of a straight line portion of a white line is difficult to determine a corresponding portion, the other portion is better if possible. Such candidate points can be extracted from the image by image recognition by using, for example, a well-known Harris corner detection method or the like.

Figure 8:
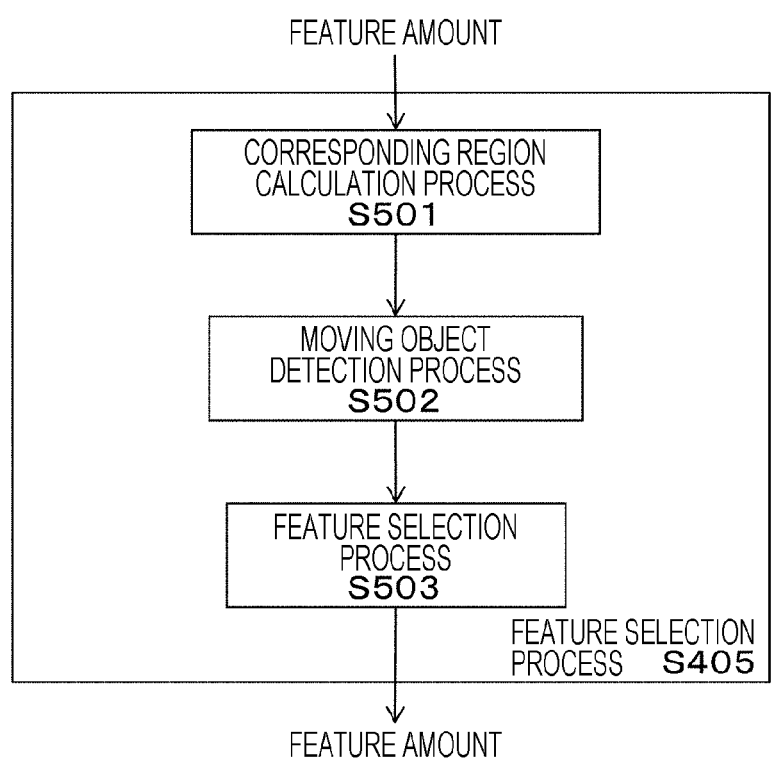
FIG. 8 is a flowchart of a feature selection process in the calibration system illustrated in FIG. 1.

In the feature selection process S405, the feature point selection unit 405 illustrated in FIG. 5 selects candidate points to be used for feature point association from the feature point candidates. As illustrated in FIG. 8, the feature selection process S405 includes three processes: a corresponding region calculation process S501, a moving object detection process S502, and a feature selection process S503.

The corresponding region calculation process S501 calculates a region in which a corresponding point candidate included in the image before the attitude change can be displaced, and does not search outside the region. This makes it possible to reduce the computation load of the calibration. Regarding the attitude change caused by the loading of the load, a change range can be previously predicted to some extent from the loading limit of the load to be loaded. A range of corresponding feature points that can occur in the attitude change range is calculated, and feature points outside the range are excluded from the candidates for association.

Here, when it is possible to associate common feature points in the images before and after the vehicle attitude change, the change angle of the vehicle attitude can be obtained based on the displacement of the feature point on the image even if the distance is unknown. However, even if the same attitude change occurs, the displacement of the feature point on the image after the change is different according to the distance to the feature point. Therefore, when setting a region to be searched to find a corresponding point candidate, it is preferable to know the distance information of the point. Therefore, a range of feature points that can occur in the assumed vehicle attitude change range is calculated by using the distance information obtained in the distance information acquisition process S402. However, since the distance information includes an error, a change range including a predetermined error is calculated. Therefore, the corresponding range of the feature points that can occur is obtained from the distance including the predetermined error and the assumed vehicle attitude change range. The corresponding range is calculated for each feature point extracted in the feature point candidate extraction process S404. The association is performed only within the corresponding range.

In the moving object detection process S502, the moving object detection unit 502 illustrated in FIG. 5 detects a moving object from the image. When associating the feature points, it is impossible to obtain a correct change of a camera attitude, if the moving object which performs movement having no relation to the vehicle attitude change is selected and included in association. Therefore, the moving object is detected in this process and excluded from the association of the feature points. In FIG. 7(A), a pedestrian surrounded by a broken line frame is a moving object to be excluded. The detection of the moving object is performed by using a well-known optical flow detection or the like. Other methods may be used to detect the moving object.

In the feature selection process S503, feature points to be used for association are actually selected from the corresponding point existence range obtained in the corresponding region calculation process S501 and information on the moving object obtained in the moving object detection process S502. Here, for example, in the case of extracting the feature points in the image before the vehicle attitude change and performing association with the image after the attitude change, the image before the vehicle attitude change is excluded from the feature point candidates when the feature point is detected on the moving object. In addition, for the image after the vehicle attitude change, the search for association is performed only within the corresponding region of each feature point candidate obtained in the corresponding region calculation process S501. For the search, SAD, SSD, and LK methods are used. The above process is a process of obtaining the feature point candidate and the corresponding region thereof by the feature selection process S405.

In the feature point association process S406, the feature point association unit 406 illustrated in FIG. 5 performs association of feature points by using the feature point candidate and the corresponding region information thereof obtained in the feature point candidate extraction process S404. In FIG. 7, broken lines indicate feature points at which the association is performed between FIG. 7(A) illustrating the image before the attitude change and FIG. 7(B) illustrating the image before and after the attitude change. There are other associable feature points in addition to this, but for convenience of illustration, only association to some feature points is illustrated.

The association of the feature points is performed in each of the cameras A, B, C, and D. In a case where the feature point extraction is performed by using the images of the cameras A, B, C, and D before the attitude change, the association is performed on the images of the cameras A, B, C, and D after the attitude change. At this time, a part with which the image around the feature point most closely coincides is found and set as the corresponding point. The degree of coincidence of the image is the sum of the feature amount differences in all the pixels within a small area (for example, nine pixels: three pixels in each of the vertical and horizontal directions) by using the feature amount (for example, an edge or an edge direction) extracted from the image and independent of the luminance. It is better to avoid the method of using the feature amount depending on the luminance, because the feature amount may change greatly when the time is free before and after the attitude change. At this time, as a caution point, the coinciding part in the corresponding image is obtained only within the corresponding region obtained by the feature selection process S405. In addition, a reverse correspondence relationship (corresponding point of the image before the attitude change with respect to the image after the attitude change) is similarly found and the accuracy of collation may be improved by employing it only when the results are the same in both cases.

In the calibration process S407, the calibration is executed by using the correspondence relationship between the feature points and the corresponding points thereof obtained by the feature point association process S406.

The calibration process S407 is, for example, performed for each of the four cameras. Elements of an unknown geometric transformation matrix are obtained by establishing equations through geometric transformation matrices representing feature point correspondences in each camera and bringing simultaneous equations obtained for each corresponding feature point. If the geometric transformation matrix can be obtained, parameters related to the position or attitude of the camera can be decomposed from the geometric transformation matrix and external parameters can be obtained. The external parameters are a three-dimensional position of a camera rotation center and a roll angle, a pitch angle, and a yaw angle representing a camera rotation angle.

Here, the roll angle is a rotation angle when a camera optical axis is a rotational axis, the pitch angle is a rotation angle when a camera axis corresponding to a horizontal axis direction of an image is a rotational axis, and the yaw angle is a rotation angle when a camera axis corresponding to a vertical axis direction of an image is a rotational axis.

Specifically, the calculation is executed by a method called an 8-point method. The 8-point method is a method of obtaining a relative attitude of two viewpoints from images photographed at the two viewpoints. If at least eight feature points are associated, a camera parameter can be directly estimated by estimating a basic matrix. For details of the 8-point method, for example, "Indoor three-dimensional environmental modeling using single-lens wide-angle camera and attitude estimation Kimitoshi Yamazaki, and others" (http://www.jsk.t.u-tokyo.ac.jp/~yamazaki/rp/ROBOMEC-08_yamazaki.pdf) is mentioned.

Figure 9:
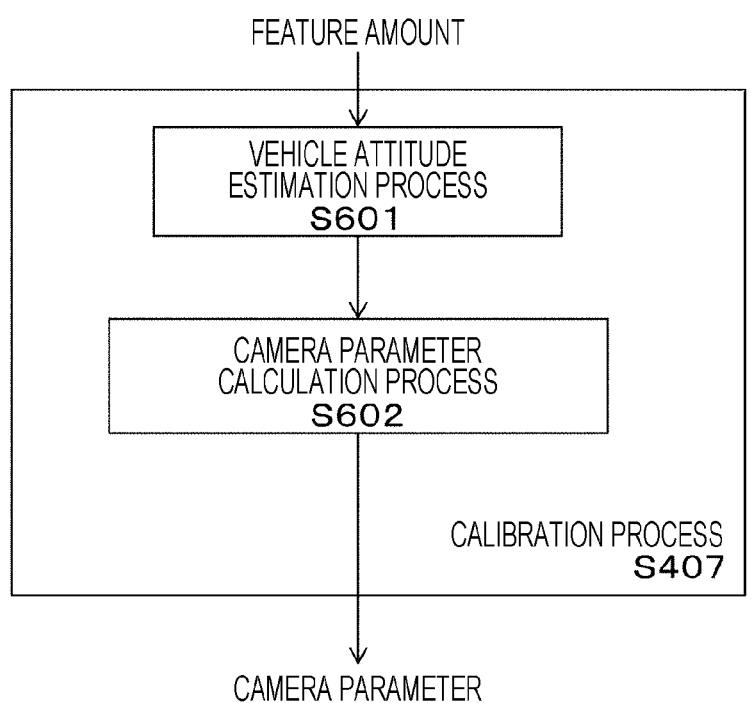
FIG. 9 is a flowchart of a calibration process in the calibration system illustrated in FIG. 1.

Alternatively, the calibration process S407 may be configured to be consisted of a vehicle attitude estimation process S601 and a camera parameter calculation process S602 as illustrated in FIG. 9. In this case, the above-described 8-point calculation is performed in the vehicle attitude estimation process S601.

In vehicle attitude estimation process S601, vehicle attitude parameters are obtained so as to obtain each camera parameter. The vehicle attitude parameters are a three-dimensional position of a vehicle rotation center and a roll angle, a pitch angle, and a yaw angle of the vehicle. Instead of individually obtaining each camera parameter, the camera parameters are obtained through the vehicle attitude. Therefore, the number of parameters to be estimated decreases from 4 cameras 24 parameters for each 1 camera 6 parameters to 6 parameters for the vehicle attitude, and the parameter estimation process is stabilized and the accuracy is improved.

In addition, even when there is a camera image that cannot take feature points and all four images cannot be used, the parameters of all the cameras can be estimated through the vehicle attitude estimation. In this case, however, it is preferable that the camera calibration has already been executed before the attitude change and an error is generated only by the attitude change. When the camera calibration before the attitude change is not performed, it is difficult to obtain the correct calibration result of all cameras even if the vehicle attitude is changed.

Figure 10:
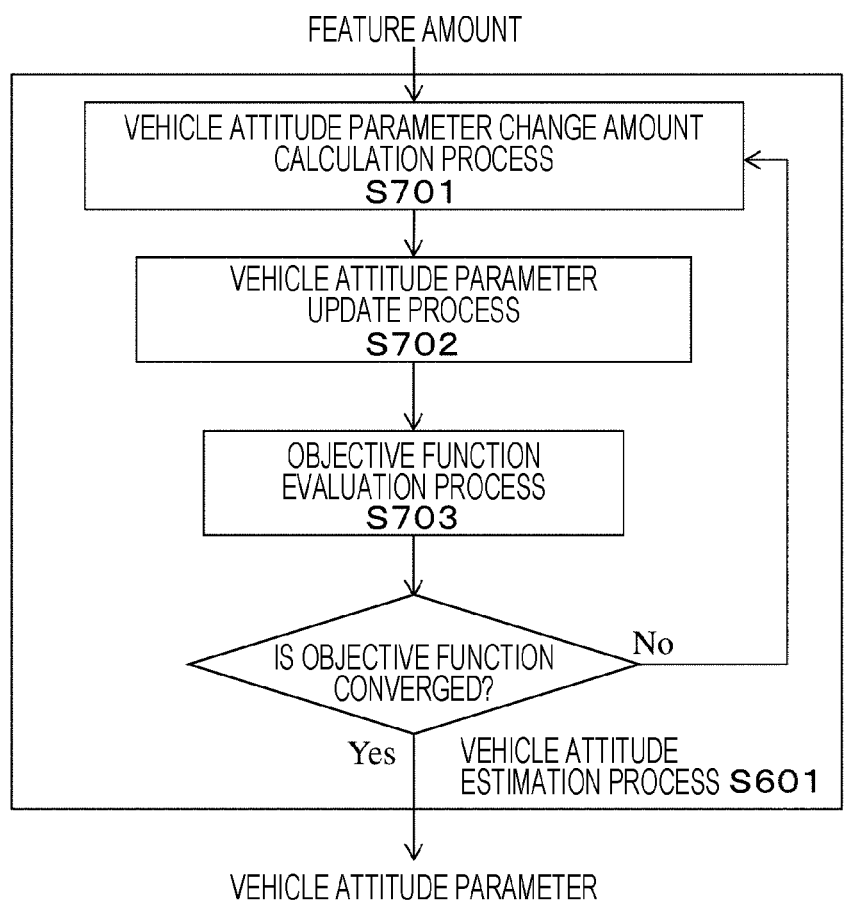
FIG. 10 is a flowchart of a vehicle attitude estimation process of the calibration process in the calibration system illustrated in FIG. 1.

In the vehicle attitude estimation process S601, the vehicle attitude estimation unit 601 illustrated in FIG. 5 obtains the vehicle attitude parameter associated with the feature points of the four cameras with no error by the optimization technique. As illustrated in FIG. 10, the vehicle attitude estimation process S601 consists of a vehicle attitude parameter change amount calculation process S701, a vehicle attitude parameter update process S702, and an objective function evaluation process S703. By repeating these, camera parameters associated with the feature points of the four cameras with no error are obtained by the optimization technique. Here, an error amount associated with the feature points is set as an objective function, and the vehicle attitude parameter is optimized so that the objective function becomes the smallest.

In vehicle attitude parameter change amount calculation process S701, a minute change amount of the vehicle attitude parameter is calculated. Here, the minute change amount of the vehicle attitude parameter in which the value of the objective function becomes small is obtained. The change amount in which the value of the objective function becomes small can be obtained by using numerical differentiation or the like.

In the vehicle attitude parameter update process S702, the vehicle attitude parameter is updated by using the minute change amount calculated in the vehicle attitude parameter change amount calculation process S701.

In the objective function evaluation process S703, the value of the objective function is obtained so as to evaluate the correctness of the obtained vehicle attitude parameter. The objective function is the sum of the square errors of the coordinate errors of the feature points and the corresponding candidate points. The sum of the square errors of the associated feature points in all cameras is used. However, when an error is included in the associated feature point, a good result cannot be obtained. Thus, like a well-known RANSAC method, a method may be employed in which evaluation is performed at feature points sampled with a certain number, a number of patterns of a sampling feature point set are used, and the best result among them is employed as an evaluation value. After that, a convergence determination is performed to determine whether the objective function value is minimized to the limit. The convergence determination is determined from the transition of the value of the objective function. For example, when the difference when compared with the value of the previous objective function is equal to or less than a preset small value, it is determined that convergence has occurred.

It is possible to obtain a vehicle attitude parameter that most coincides with the feature points of all the cameras at the same time by repeating the vehicle attitude parameter change amount calculation process S701, the vehicle attitude parameter update process S702, and the objective function evaluation process S703 until the objective function converges.

In the camera parameter calculation process S602, the camera parameter calculation unit 602 calculates four camera parameters by using the obtained vehicle attitude parameter. If the vehicle attitude parameter is obtained, corresponding camera parameters can be easily calculated by coordinate transformation.

As described above, in the calibration apparatus according to this embodiment, when the camera parameter can change according to the change of the vehicle attitude, such as the change of the loading state of the object with respect to the vehicle, the calibration can be quickly executed.

For example, the camera can be calibrated even when the loading state on the vehicle changes while the vehicle is stopped, and can be corrected whenever the loading state changes. For example, even when the passenger gets off the vehicle just before the vehicle is parked and the loading state changes, the distance on the ground can be correctly measured by calibration. It is also possible to implement a case where a riding state changes, such as a function of automatically parking by recognizing a position of a white line. In addition, when the passenger other than the driver gets off the vehicle before parking and only the driver carries out parking, or even when a person is carried on the side of the road and the vehicle is restarted, the calibration can be executed immediately after the loading state changes.

The present invention is not limited to the above-described embodiments and various modifications can be made thereto. For example, the embodiments have been described in detail for easy understanding of the present invention and are not intended to limit to those necessarily including all the above-described configurations. In addition, a part of a configuration of a certain embodiment can be replaced with a configuration of another embodiment, and a configuration of another embodiment can be added to a configuration of a certain embodiment. In addition, it is possible to add, remove, or replace another configuration with respect to a part of a configuration of each embodiment.

In addition, control lines or information lines indicate what is considered to be necessary for the description, and all the control lines or information lines are not necessarily illustrated on products. In practice, it can be considered that almost all the structures are mutually connected.

In addition, a method for individually determining each camera parameter may be used. Here, the 8-point method described in the above embodiment was to obtain each camera parameter of the roll angle, the pitch angle, and the yaw angle at the same time. On the other hand, when each camera parameter is individually obtained, it is considered to use a mark having linearity, such as a white line. When the vehicle attitude changes, the inclination angle of the mark having linearity changes on the image. Therefore, it is only necessary to obtain the camera parameter in which the inclination angle is the same as the original image.

Specifically, for example, as illustrated in FIG. 3, when the vehicle attitude changes so that the vehicle sinks in the front-back direction, a pair of white lines photographed by the front camera A spreads farther away from the camera, and a pair of white lines photographed by the rear camera B narrows farther away from the camera. Therefore, the pitch angle can be calibrated by using this phenomenon. In addition, when the vehicle attitude changes so that the vehicle sinks in the left-right direction, a pair of white lines photographed by the front camera A and the rear camera B is different in appearance on the left and right, and the white lines photographed by the left camera C and the right camera D are also different from each other. Therefore, the roll angle can be calibrated by using this phenomenon. In this way, it is possible to calibrate camera parameters of the roll angle or the pitch angle, or both of the roll angle and the pitch angle.

In addition, the example in which the calibration is executed by using the images before and after the attitude change of the vehicle has been described in the above-described embodiment. However, regardless of whether the attitude of the vehicle has changed, the image at the time of stopping the vehicle and the image at the time of starting the vehicle may be used. In this case, the stop of the vehicle can be determined by detecting, for example, the fact that the vehicle speed detected by the vehicle speed sensor has reached 0 km/h, the fact that the shift position is parking, or the fact that the vehicle is not moved relative to the surrounding environment based on the image photographed by the camera. In addition, the start of the vehicle can be determined by using, for example, the fact that the vehicle speed detected by the vehicle speed sensor exceeds 0 km/h, the fact that the shift position is changed from parking to another shift position, the fact that the movement of the vehicle relative to the surrounding environment is detected based on the image photographed by the camera, or the fact that the ignition switch of the engine is turned on.

Figure 11:
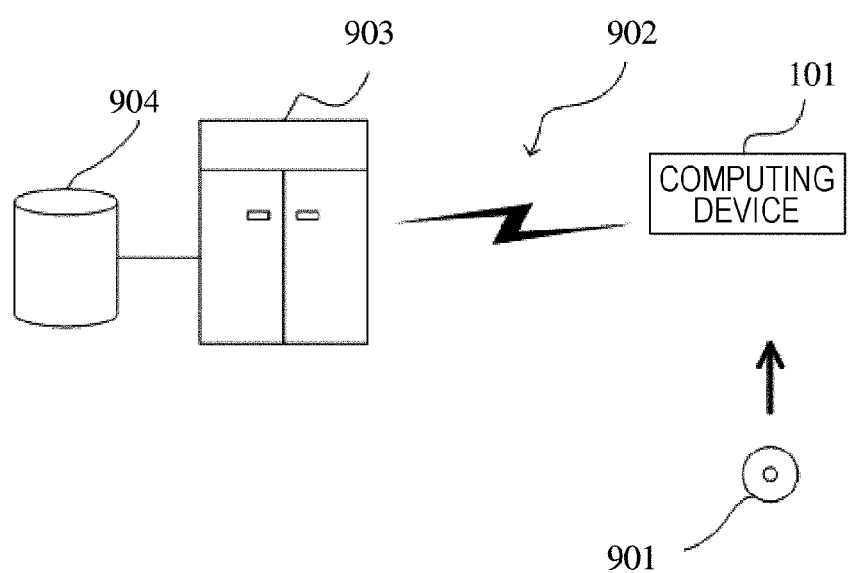
FIG. 11 is a diagram illustrating an aspect of providing a program to a computing device.

The program stored in the computing device 101 can be provided through a recording medium such as CD-ROM or a data signal via the Internet. FIG. 11 is a diagram illustrating this aspect. The computing device 101 receives the provision of the program through a CD-ROM 901. In addition, the computing device 101 has a function of connecting to a communication line 902. A computer 903 is a server computer which provides the program, and stores the program in a recording medium such as a hard disk 904. The communication line 902 is a communication line such as the Internet or personal computer communication, or a dedicated communication line. The computer 903 reads the program by using the hard disk 904, and transmits the program to the computing device 101 via the communication line 902. That is, the program is transmitted as a data signal via the communication line 902. In this manner, the program can be supplied as a computer-readable computer program product in various forms, such as a recording medium or a data signal (carrier wave).

The disclosure of the following priority application is incorporated herein by reference.

Japanese Patent Application No. 2015-205979 (filed on Oct. 20, 2015)

REFERENCE SIGNS LIST 100 calibration system
101 computing device
104 display device
404 feature point candidate extraction unit
405 feature point selection unit
406 feature point association unit
502 moving object detection unit
601 vehicle attitude estimation unit
602 camera parameter calculation unit

The invention claimed is:

1. A calibration apparatus for calibrating a camera mounted on a vehicle, comprising:
a camera which acquires an image of outside of the vehicle; and
a computing device storing a calibration program which:
calibrates a camera parameter of at least one of a roll angle and a pitch angle of the camera by using a corresponding feature point between an image before an attitude change of the vehicle and an image after the attitude change; and
sets a feature point change range based on a loading state of an object on the vehicle, and a corresponding feature point is searched for within the feature point change range based on a feature point included in the image before the attitude change of the vehicle, wherein
the image before the attitude change is an image photographed when the vehicle is stopped, and
the image after the attitude change is an image photographed when the vehicle is started.

2. The calibration apparatus according to claim 1, comprising a vehicle attitude change detection sensor which detects the attitude change of the vehicle,
wherein the calibration is executed when the attitude change is detected by the vehicle attitude change detection sensor.

3. The calibration apparatus according to claim 1, wherein the calibration program comprises:
a feature point candidate extraction process which extracts feature point candidates from the image;
a feature point selection process which selects the feature point candidates extracted by the feature point candidate extraction process; and
a feature point association process which associates a candidate point selected by the feature point selection process between the image before the attitude change of the vehicle and the image after the attitude change, and
the calibration is executed by using the feature point associated by the feature point association process.

4. The calibration apparatus according to claim 1, wherein the calibration program comprises a moving object detection process which detects a moving object around the vehicle, and
 a feature point other than the moving object is selected from feature points included in the image before the attitude change of the vehicle.

5. The calibration apparatus according to claim 1, wherein the calibration apparatus is configured to calibrate a plurality of cameras mounted on the vehicle, and
 the calibration program comprises:
 a vehicle attitude estimation process which estimates the attitude of the vehicle; and
 a camera parameter calculation process which calculates camera parameters of the plurality of cameras based on the attitude of the vehicle estimated by the vehicle attitude estimation process.

6. The calibration apparatus according to claim 5, wherein the vehicle attitude estimation process sets an objective function and estimates the attitude of the vehicle by obtaining a vehicle attitude parameter which minimizes the objective function.

7. A calibration method of calibrating a camera mounted on a vehicle, comprising:
 acquiring an image of the outside of the vehicle;
 calibrating a camera parameter of at least one of a roll angle and a pitch angle of the camera by using a corresponding feature point between an image before an attitude change of the vehicle and an image after the change; and
 setting a feature point change range based on a loading state of an object on the vehicle, and a corresponding feature point is searched for within the feature point change range based on a feature point included in the image before the attitude change of the vehicle, wherein
 the image before the attitude change is an image photographed when the vehicle is stopped, and
 the image after the attitude change is an image photographed when the vehicle is started.

8. A calibration program product for causing a computer to calibrate a camera mounted on a vehicle, comprising:
 a camera which acquires an image of the outside of the vehicle; and
 a calibration program stored on a computer which:
 calibrates a camera parameter of at least one of a roll angle and a pitch angle of the camera by using a corresponding feature point between an image before an attitude change of the vehicle and an image after the attitude change; and
 sets a feature point change range based on a loading state of an object on the vehicle, and a corresponding feature point is searched for within the feature point change range based on a feature point included in the image before the attitude change of the vehicle, wherein
 the image before the attitude change is an image photographed when the vehicle is stopped, and
 the image after the attitude change is an image photographed when the vehicle is started.

* * * * *